United States Patent
Bouvet

(10) Patent No.: US 11,363,134 B2
(45) Date of Patent: Jun. 14, 2022

(54) GATEWAY AND METHOD FOR MANAGING VOIP TELEPHONE SERVICE

(71) Applicant: Orange, Paris (FR)

(72) Inventor: Bertrand Bouvet, Perros Guirec (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/439,414

(22) Filed: Jun. 12, 2019

(65) Prior Publication Data

US 2019/0394327 A1    Dec. 26, 2019

(30) Foreign Application Priority Data

Jun. 12, 2018    (FR) ...................................... 1855100

(51) Int. Cl.
*H04M 3/14*       (2006.01)
*H04L 65/1101*    (2022.01)
*H04L 65/1033*    (2022.01)
*H04M 1/253*      (2006.01)
(Continued)

(52) U.S. Cl.
CPC ........ *H04M 3/14* (2013.01); *H04L 29/06027* (2013.01); *H04L 65/104* (2013.01);
(Continued)

(58) Field of Classification Search
CPC . G06F 19/00; G06F 1/3287; H04L 29/06027; H04L 65/104; H04L 65/1069; H04L 67/12; H04L 12/1818; H04L 67/2823; H04L 45/72; H04L 65/105; H04L 45/74; H04L 65/102; H04L 65/1046; H04L 67/2804; H04L 69/40; H04L 1/0025; H04L 5/0055; H04L 12/16; H04L 12/2856; H04L 12/2861; H04L 12/2898; H04L 12/5601; H04L 12/5692; H04L 12/66; H04L 41/085; H04L 47/365; H04L 47/822; H04L 61/1529; H04L 16/2084; H04L 65/1016; H04L 65/103; H04L 65/1036; H04L 65/1053; H04L 65/1059; H04L 65/1073; H04L 65/4007; H04L 65/80; H04L 67/02; H04L 67/025; H04L 67/16; H04M 1/2535; H04M 1/82; H04M 3/14; H04M 7/0081; H04M 3/12; H04M 3/5231; H04M 7/006; H04M 7/121; H04M 1/72469; H04M 1/72484; H04M 1/72409; H04M 1/725; H04M 1/738; H04M 3/42365;
(Continued)

(56) References Cited

U.S. PATENT DOCUMENTS 6,363,065 B1 *   3/2002   Thornton ................ H04L 12/14
                                                            370/352
7,050,426 B2 *   5/2006   Veschi ................... H04L 65/104
                                                            370/356
(Continued)

OTHER PUBLICATIONS

French Search Report and Written Opinion dated Jan. 15, 2019 for French Application No. 1855100.

*Primary Examiner* — Gerald Gauthier

(74) *Attorney, Agent, or Firm* — Knobbe, Martens, Olson & Bear, LLP

(57) ABSTRACT

The method performed by a gateway between a LAN and a WAN that includes a platform of the VoIP telephone service, is characterized in that it includes a step of activating the VoIP telephone service on detecting a connected state of a terminal connected to the gateway.

20 Claims, 4 Drawing Sheets

(51) Int. Cl.
*H04M 1/82* (2006.01)
*H04M 7/00* (2006.01)

(52) U.S. Cl.
CPC ........... *H04M 1/2535* (2013.01); *H04M 1/82* (2013.01); *H04M 7/0081* (2013.01)

(58) Field of Classification Search
CPC ...... H04M 3/436; H04M 3/44; H04M 7/0066; H04M 7/0069; H04M 7/0078; H04M 7/1205; H04M 7/128; H04W 16/20; H04W 4/16; H04W 16/26; H04W 12/084; H04W 8/26; H04W 52/0212; H04W 72/042; H04W 72/1268; H04W 72/1289; H04W 78/18; H04W 78/25; H04W 76/18; H04W 76/25; H04B 7/15507; G06Q 40/025; G06Q 30/0641; G16H 10/60; H04Q 3/0045; H04Q 11/04; H04Q 11/0421
USPC .... 370/142.1, 259, 338, 352, 401, 329, 356, 370/412, 328, 354, 218, 221, 230, 235, 370/255, 330, 336, 216, 248, 252; 379/377, 142.1, 93.01, 220.01, 142.04, 379/219, 265.01, 413.02, 45; 455/404.2, 455/417, 414.2; 705/26.1; 709/221, 222, 709/229, 202; 726/7; 398/72
See application file for complete search history.

(56) References Cited

U.S. PATENT DOCUMENTS

| | | | | |
|---|---|---|---|---|
| 7,336,603 | B2* | 2/2008 | Sugiyama | H04L 41/5009 370/230 |
| 7,548,535 | B1* | 6/2009 | Godwin | H04M 7/121 370/352 |
| 7,706,356 | B1* | 4/2010 | Olshansky | H04L 12/66 370/352 |
| 7,843,903 | B2* | 11/2010 | Bakke | H04L 67/18 370/354 |
| 8,117,290 | B2* | 2/2012 | Hamilton | H04L 41/085 709/221 |
| 8,457,011 | B2* | 6/2013 | Tung | H04L 65/1069 370/252 |
| 8,873,718 | B2* | 10/2014 | Dickinson | H04W 4/029 379/45 |
| 9,106,714 | B2* | 8/2015 | Kumarasamy | H04L 65/1059 |
| 9,497,229 | B2* | 11/2016 | Qiu | H04L 69/40 |
| 9,554,275 | B1* | 1/2017 | Bantoft | H04L 67/12 |
| 10,057,412 | B1* | 8/2018 | Salour | H04L 65/104 |
| 10,979,334 | B1* | 4/2021 | Bagrin | H04L 43/10 |
| 10,992,811 | B2* | 4/2021 | Moller | H04L 67/306 |
| 2002/0085569 | A1* | 7/2002 | Inoue | H04L 47/10 370/401 |
| 2003/0103512 | A1* | 6/2003 | Sugihashi | H04L 12/2856 370/401 |
| 2003/0123435 | A1* | 7/2003 | Yeom | H04L 65/1009 370/352 |
| 2005/0180434 | A1* | 8/2005 | Marcu | H04L 12/66 370/401 |
| 2005/0281277 | A1* | 12/2005 | Killian | H04L 47/365 370/412 |
| 2006/0251236 | A1* | 11/2006 | Peters | H04M 3/5166 379/265.01 |
| 2006/0268826 | A1* | 11/2006 | Son | H04L 12/5692 370/352 |
| 2007/0041371 | A1* | 2/2007 | Hattori | H04M 1/72527 370/352 |
| 2007/0115941 | A1* | 5/2007 | Patel | H04L 65/4007 370/352 |
| 2007/0140224 | A1* | 6/2007 | Cheng | H04L 29/06027 370/352 |
| 2007/0147399 | A1* | 6/2007 | Deng | H04L 29/12094 370/401 |
| 2007/0268893 | A1* | 11/2007 | Lo | H04M 7/0069 370/356 |
| 2007/0280205 | A1* | 12/2007 | Howell | H04L 12/66 370/352 |
| 2008/0112551 | A1* | 5/2008 | Forbes | H04L 9/32 379/142.1 |
| 2008/0125077 | A1* | 5/2008 | Velazquez | H04L 12/66 455/404.2 |
| 2008/0159302 | A1* | 7/2008 | Tu | H04L 12/2856 370/401 |
| 2008/0310307 | A1* | 12/2008 | Yeom | H04L 47/2416 370/235 |
| 2009/0003312 | A1* | 1/2009 | Velazquez | H04M 3/5116 370/352 |
| 2009/0070229 | A1* | 3/2009 | Ansari | G06Q 30/0601 705/26.1 |
| 2009/0136021 | A1* | 5/2009 | Delva | H04Q 11/0421 379/413.02 |
| 2009/0164611 | A1* | 6/2009 | Corda | H04L 12/2898 709/222 |
| 2009/0168787 | A1* | 7/2009 | Ansari | H04L 12/66 370/401 |
| 2009/0175434 | A1* | 7/2009 | Becker | H04M 1/725 379/220.01 |
| 2009/0252063 | A1* | 10/2009 | Owen | H04L 67/34 370/255 |
| 2009/0296918 | A1* | 12/2009 | Becker | H04M 7/0069 379/219 |
| 2010/0238875 | A1* | 9/2010 | Sung | H04L 1/1854 370/329 |
| 2011/0038364 | A1* | 2/2011 | Monsieux | H04Q 11/04 370/352 |
| 2011/0261810 | A1* | 10/2011 | Travel | H04M 3/42365 370/352 |
| 2012/0063432 | A1* | 3/2012 | Hurd | H04M 3/42289 370/338 |
| 2012/0207152 | A1* | 8/2012 | Chang | H04M 7/1255 370/356 |
| 2013/0163404 | A1* | 6/2013 | Sun | H04L 65/1069 370/216 |
| 2013/0163477 | A1* | 6/2013 | Fighel | H04L 65/1069 370/259 |
| 2013/0208693 | A1* | 8/2013 | De La Forest Divonne | H04W 76/10 370/329 |
| 2013/0294443 | A1* | 11/2013 | Kahn | H04L 65/103 370/352 |
| 2014/0129613 | A1* | 5/2014 | Van Depoel | H04L 65/1053 709/202 |
| 2014/0219167 | A1* | 8/2014 | Santhanam | H04W 28/0268 370/328 |
| 2014/0355989 | A1* | 12/2014 | Finkelstein | H04L 12/2896 398/72 |
| 2015/0201086 | A1* | 7/2015 | Abi | H04M 1/2535 370/352 |
| 2015/0347683 | A1* | 12/2015 | Ansari | H04L 9/30 726/7 |
| 2015/0365520 | A1* | 12/2015 | Bennett | H04M 3/2281 455/417 |
| 2015/0373173 | A1* | 12/2015 | Taher | H04M 1/72519 370/328 |
| 2016/0234159 | A1* | 8/2016 | Cooper | H04L 65/1046 |
| 2017/0054784 | A1* | 2/2017 | Panattu | H04L 65/80 |
| 2017/0181006 | A1* | 6/2017 | Vardarajan | H04W 16/20 |
| 2017/0244833 | A1* | 8/2017 | Naughton | H04L 65/1069 |
| 2017/0344703 | A1* | 11/2017 | Ansari | H04L 63/0876 |
| 2018/0198921 | A1* | 7/2018 | Li | H04L 65/102 |
| 2018/0255112 | A1* | 9/2018 | Wang | H04L 65/1069 |
| 2019/0394327 | A1* | 12/2019 | Bouvet | H04L 65/1006 |
| 2020/0092218 | A1* | 3/2020 | Flomen | H04L 47/28 |
| 2021/0099500 | A1* | 4/2021 | Russo | H04L 12/66 |
| 2021/0103983 | A1* | 4/2021 | Raleigh | H04M 15/00 |

* cited by examiner

GATEWAY AND METHOD FOR MANAGING VOIP TELEPHONE SERVICE

BACKGROUND OF THE INVENTION

The invention relates to the general field of telecommunications. It relates more particularly to providing a service of voice over Internet protocol (IP), known as VoIP.

The VoIP telephone service may be made available by a services provider to customers in a package that also combines various other services such as Internet access services, television service, video on demand (VoD) service, voice over WiFi (VoWiFi), etc.

FIG. 1 shows an example of network architecture in the prior art enabling a customer to benefit from these services, and in particular from the VoIP telephone service.

A gateway BX is placed within a local area network (LAN) of the customer and can connect to a network NET of the service provider. The gateway BX serves to connect terminals of the LAN, such as a telephone TRM, a TV set, or a computer ORD to servers providing services, such as a VoIP telephone service platform P_VoIP, a voice messaging service platform P_msg, an Internet protocol TV (IPTV) service platform P_IPTV, or a router rtr enabling the LAN to be connected to the Internet.

The gateway BX has at least one IP address and at least one VoIP configuration. It exchanges call signaling messages with the VoIP telephone platform P_VoIP for the purpose of sending and receiving telephone calls. The signaling complies with a VoIP protocol or protocol stack, e.g. the session initiation protocol (SIP) of standard IETF 3261, the IP multimedia subsystem (IMS) of standard 3GPP TS24.229, H323, the media gateway control protocol (MGCP), or web real time communication (WebRTC).

This method of managing VoIP telephone service by the gateway BX presents certain drawbacks when the customer decides not to use the VoIP telephone service.

Firstly, concerning the network NET of the service provider, when the VoIP telephone service is not used by the customer, the following are overdimensioned in terms of memory and central processor unit (CPU) calculation capacity:
  the VoIP telephone service platform P_VoIP;
  the voice messaging platform P_msg if the customer has subscribed to a voice messaging service; and
  the dynamic host configuration protocol (DHCP) network attachment servers when the gateway BX presents a multiple virtual LAN (Multi-VLAN) architecture or a multiple virtual channel (Multi-VC) architecture.

For a gateway BX with a Multi-VLAN or a Multi-VC architecture, this method of managing the VoIP telephone service also presents a waste of IP addresses since an IP address is allocated to the gateway BX specifically for the VoIP telephone service.

The signaling traffic between the gateway BX and the platform P_VoIP constitutes pointless recurrent traffic. This traffic makes operations of configuring network equipment more complicated when updating software, and it also makes operations of restarting the VoIP telephone signal more complicated, and it limits the ability to take on new customers since the capacity of the platform P_VoIP is limited and gives rise to additional energy consumption for powering and cooling its servers.

Secondly, concerning the customer's LAN, the bandwidth available for other services is not optimized. Specifically, the signaling traffic that makes the VoIP telephone service available has higher priority than the traffic corresponding to other services and can lead to additional delays. Furthermore, the electricity consumption of the gateway BX is increased as a result of the recurrent and pointless signaling traffic.

There therefore exists a need to enable a VoIP telephone service to be managed by a gateway without presenting the drawbacks of the prior art.

OBJECT AND SUMMARY OF THE INVENTION

The invention provides a method of managing a VoIP telephone service performed by a gateway between a LAN and a network that includes a platform of the VoIP telephone service. The method includes a step of activating the VoIP telephone service on detecting a connected state of a terminal connected to the gateway.

Correspondingly, the invention provides a gateway between a LAN and a network including a VoIP telephone service platform, the gateway comprising:
  at least one detector module for detecting a connected state of a terminal connected to the gateway; and
  a module for managing the VoIP telephone service, this module being configured to activate the VoIP telephone service on detecting the connected state.

The gateway in accordance with the invention performs the method of the invention for managing a VoIP telephone service.

The network including the VoIP telephone service platform may be a metropolitan network (MAN) or a wide area network (WAN).

In the meaning of the invention, the terminal may be a telephone, a computer, a tablet, or some other communicating device capable of using a VoIP telephone service.

The terminal may be an analog or digital wired telephone, or a digital wireless telephone, e.g. using digital enhanced cordless telecommunications (DECT) technology or the cordless advanced technology—Internet and quality (CAT-iq) technology.

The characteristics and advantages of the method of the invention for managing a VoIP telephone service as described below apply in the same manner to a gateway in accordance with the invention and vice versa.

The invention serves to optimize resources in terms of calculation capacity and of storage capacity in the VoIP telephone service platform, in terms of bandwidth for the gateway, and in terms of the energy consumption of the gateway and of the VoIP telephone service platform.

In an implementation, the gateway constitutes a network terminating equipment, and is situated in the same LAN as the terminal. Such equipment offering numerous services is marketed in France under the term "box", e.g. LiveBox equipment (marketed by Orange France).

In an implementation, the connected state of the terminal is detected as a result of the terminal pairing with the gateway. For example, when the terminal is a DECT or CAT-iq type telephone, becoming paired with a wireless digital telephone base integrated in the gateway enables its connected state to be detected.

In another implementation, the connected state of the terminal is deduced from detecting an off-hook state of the terminal.

This implementation may apply when the terminal is an analog telephone capable of connecting to an analog port of the gateway, or when the terminal is a wireless digital telephone placed on a wireless digital telephone base connected to an analog port of the gateway.

In fact, analog telephone terminals and wireless digital telephone bases are in open circuit mode when the terminals are hung up. It is only when the terminal goes off-hook that current is detected since the electric circuit is closed when the user picks up the terminal. Detecting this current makes it possible to detect a connected and off-hook state of the terminal.

Detecting that a terminal is connected to the gateway by detecting that the terminal is off-hook is more advantageous than detecting connection mechanically. In fact, a cable may be connected to the gateway without a terminal being connected to the cable.

Furthermore, the gateway cannot detect a connection on its analog port by sending messages using the V23 signaling protocol on the analog port, since the V.23 protocol does not provide for acknowledgment.

In an implementation, activation of the VoIP telephone service depends on detecting both the connected states and the off-hook state of the terminal.

This implementation presents the advantage of better optimization with a wireless digital terminal, since the VoIP telephone service is activated only if it is actually being used by the terminal. In fact, an off-hook state of the terminal indicates that a call is being sent or received.

In the meaning of the invention, the VoIP telephone service is said to be actually in use if there exists a telephone terminal connected to the gateway and if that terminal has sent or received at least one telephone call during an observation duration.

In an implementation, the method of the invention for managing a VoIP telephone service includes a step of deactivating the VoIP telephone service after detecting expiry of a countdown timer that is reinitialized each time the service is activated.

In this implementation, if no connected state or connected and off-hook state has been detected when a duration determined by the countdown expires, then the gateway deactivates the VoIP telephone service.

In the invention, the countdown constitutes an observation window for deciding whether or not to deactivate the VoIP telephone service in the gateway.

The value of the countdown may be adjustable.

In an implementation, the method of the invention for managing a VoIP telephone service includes a step of reinitializing the countdown on detecting a hung-up state following detection of an off-hook state of the terminal.

In fact, this hung-up state marks the end of a call. The observation window is thus updated at the end of the call.

In an implementation, the method of the invention for managing a VoIP telephone service includes a step of receiving a notification from a voice messaging platform concerning a voice message for the terminal, voice message was redirected to the voice messaging platform while the VoIP telephone service was not activated.

Voice messages can thus be recovered even if the VoIP telephone service is not activated on the gateway. The VoIP telephone service platform redirects unanswered calls to the voice messaging platform. In the event of the VoIP telephone service being reactivated in the gateway, if the gateway has subscribed to a voice messaging service, it is notified of the existence of voice messages that have not been listened to. In turn, the gateway transmits the notification to the terminal, with it being left to the user to consult the messages in conventional manner from the terminal.

In an implementation, when unanswered calls are redirected to the voice messaging service, the VoIP telephone service platform notifies the user of the VoIP telephone terminal, e.g. by sending to him an email or a message on his mobile telephone.

In an embodiment, the detector module is configured to detect an off-hook state of the terminal connected to said gateway.

In an embodiment, the detector module is an electronic component, e.g. an electronic component included in a connection port of the terminal.

In an embodiment, the detector module includes an electronic component and a software application controlling the component.

In an embodiment, the module for managing the VoIP telephone service in the gateway of the invention is configured to activate the VoIP telephone service on detecting both the connected state and the off-hook state of the terminal.

In an embodiment, the gateway of the invention includes a wireless telephone base, which base includes an electronic component configured to detect at least one state of the terminal selected from the connected state and the off-hook state.

Configuring a wireless digital telephone type terminal on the wireless telephone base enables the gateway to detect the connected state of the terminal.

In an embodiment, the gateway of the invention includes at least one electronic component of the foreign exchange subscriber (FXS) type that is configured to detect the off-hook state of the terminal and to deduce that it is in the connected state.

The invention can thus be applied to managing VoIP telephone service when an analog or digital telephone is used and connected to an FXS port of the gateway. The invention also applies to a wireless digital telephone having its base connected to the FXS port.

In an embodiment, the gateway of the invention includes a countdown timer controlled by the module for managing the VoIP telephone service, in order to determine how the management module is to be operated.

The invention also provides a computer program on a data medium, the program being suitable for being performed in a computer or in a gateway of the invention, the program including instructions adapted to performing a method as described above for managing a VoIP telephone service.

The program may use any programming language, and be in the form of source code, object code, or code intermediate between source code and object code, such as in a partially compiled form, or in any other desirable form.

The invention also provides computer-readable data or recording media including instructions of the above-mentioned computer program.

The data or recording media may be any entity or device capable of storing the program. For example, the media may comprise storage means such as a read only memory (ROM), e.g. a compact disk (CD) ROM, or a microelectronic circuit ROM, or indeed magnetic recording means, e.g. a floppy disk or a hard disk, or a flash memory.

The data or recording media may also be transmissible media such as an electrical or optical signal, suitable for being conveyed via an electrical or optical cable, over a wireless radio or optical link, or by other means.

The program of the invention may in particular be downloaded from an Internet type network.

Alternatively, each data or recording medium may be an integrated circuit in which the program is incorporated, the circuit being adapted to execute or to be used in the execution of the method of the invention.

BRIEF DESCRIPTION OF THE DRAWINGS

Other characteristics and advantages of the present invention appear from the following description made with reference to the accompanying drawings, which show an implementation having no limiting character. In the figures.

DETAILED DESCRIPTION OF A FIRST IMPLEMENTATION

Figure 1:
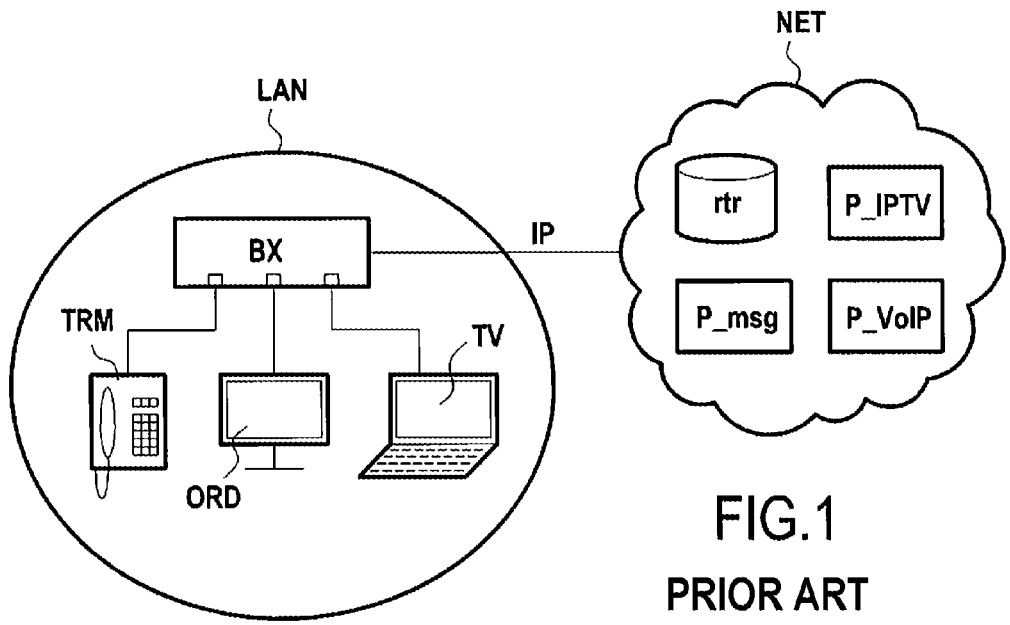
FIG. 1, described above, shows an architecture of a network suitable for performing a prior art method for managing a voice over IP service.
Figure 2:
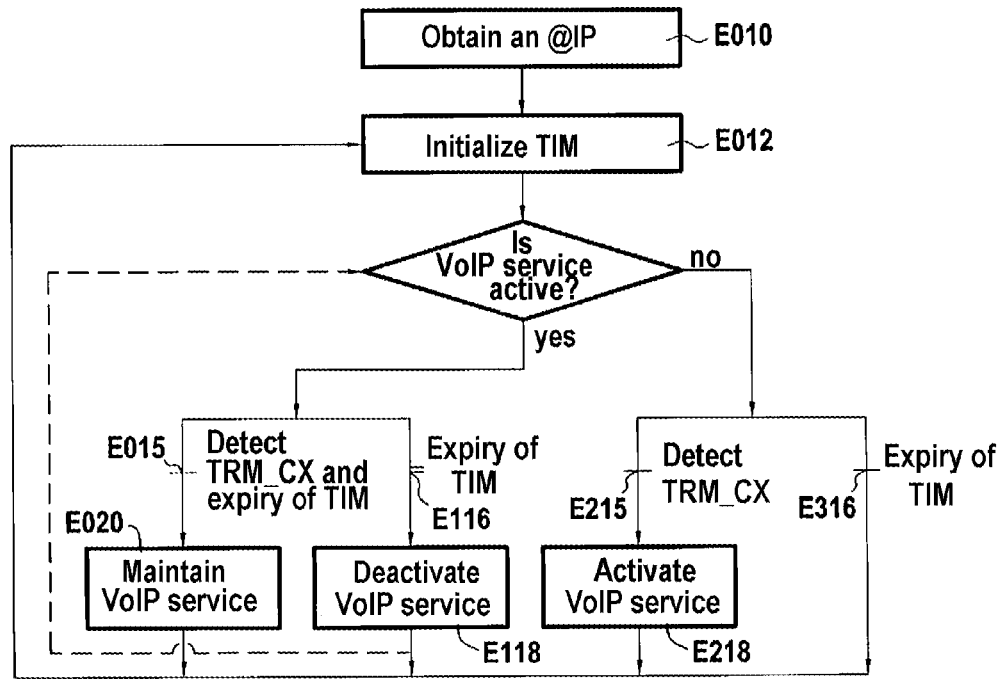
FIG. 2 is a flow chart showing the steps of a voice over IP service management method in accordance with a first implementation of the invention.

FIG. 2 is a flow chart showing steps of a voice over IP service management method in accordance with a first implementation of the invention.

Figure 3:
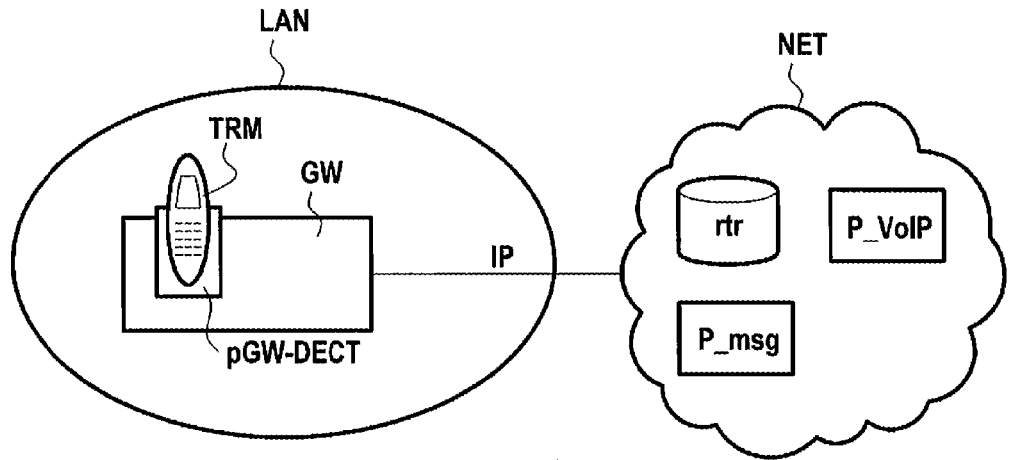
FIG. 3 shows a network architecture enabling a voice over IP service management method to be performed in accordance with the first implementation of the invention.

FIG. 3 shows an architecture of a network enabling the voice over IP service management method to be performed in accordance with this first implementation.

The method of the invention is performed by a gateway GW between a local area network LAN and a network NET of a VoIP telephone service provider, with reference to steps E215 and E218 described below.

In this implementation, the gateway GW is a piece of network terminal equipment, including a wireless telephone base using DECT technology to which it is possible to connect a DECT type terminal TRM. This base integrated in the gateway includes an electronic component, or "chipset", pGW_DECT.

In this implementation, the network NET of the service provider includes a VoIP telephone service platform server P_VoIP and a voice messaging platform server P_msg.

In this implementation, the gateway GW communicates with the server P_VoIP and with the server P_msg in compliance with the SIP protocol.

A VoIP communication application is installed on the gateway GW.

The VoIP telephone service is initially not activated on the gateway GW.

During a step E010 of starting the gateway GW, the gateway GW applies a network attachment procedure, which consists in having at least one public IP address allocated thereto by an IP address allocation server (not shown in FIG. 3), e.g. a DHCP server or a broadband access server (BAS), so as to be able to benefit from an Internet connection service.

During the step E010, the gateway has a public IP address for Internet service allocated thereto by the address allocation server.

During a step E012, the gateway GW initializes a time countdown TIM, e.g. having a duration of 2 months. Thereafter, this duration determines the duration for which the VoIP telephone service is activated.

During a step E215, the gateway GW detects that the terminal TRM is connected to the gateway GW by means of the electronic component pGW_DECT of the DECT base integrated in the gateway.

When a DECT type terminal TRM becomes paired with the DECT base integrated in the gateway GW, application programming interfaces (APIs) of the component pGW_DECT generate a notification that is received by the VoIP communication application.

On detecting this connection of the terminal TRM (step E215), the gateway GW activates the VoIP telephone service during a step E218.

The step E218 of activating the VoIP telephone service is identical to the prior art. A general description of this activation step is given below by way of example.

The gateway GW uses the Internet service to send a packet to a configuration server (not shown in FIG. 3) requesting downloading of a VoIP configuration. This server relies on the source IP address of the packet it receives to identify the gateway GW, and it sends the VoIP configuration parameters to the gateway GW.

In this mode, the VoIP configuration parameters comprise:
a domain name to be used for the VoIP telephone service, e.g. of the fully qualified domain name (FQDN) type;
a public telephone identity, e.g. of the IP multimedia public user identity (IMPU) type, such as a telephone number;
a private identity allocated to the gateway GW, e.g. of the IP multimedia private identity (IMPI) type;
an SIP key for authenticating the SIP protocol stack with the platform P_VoIP of the VoIP telephone service;
an address to be used for an entry point of the platform P_VoIP, e.g. of the FQDN type or of the "IP address: port number" type;
an identifier of a network voice messaging service associated with the VoIP line, e.g. a universal resource identifier (URI) of a message waiting indicator (MWI) service; and
an identifier of a conference bridge associated with the VoIP line for calls having more than two participants.

The gateway GW receives these configuration parameters and obtains the IP address and the port number of the entry point of the platform P_VoIP.

In this implementation, the gateway GW presents a Multi-VLAN or Multi-VC architecture. The SIP protocol stack installed on the gateway GW triggers the procedure for obtaining an IP address dedicated to the VoIP telephone service and then sends an SIP registration request message to the entry point of the platform P_VoIP. In this mode, this registration request message is an SIP REGISTER message.

In another implementation corresponding to a mono-ULAN or mono-VC architecture, the same public IP address is allocated (E010) to the gateway GW for all of the services, including the VoIP telephone service.

SIP registration seeks to provide the platform P_VoIP of the VoIP telephone service with a correspondence link between the public telephone identity IMPU of the terminal TRM and the address of contact (AoC) where the terminal TRM can be reached.

The AoC technical address corresponds to:
the IP address of the gateway GW dedicated to the VoIP telephone service (or the sole allocated IP address in the context of a mono-VLAN or mono-VC architecture);
a transport protocol for use when transporting SIP call signaling IP packets, e.g. one of the following protocols; UDP, TCP, SCTP, or TLS; and
a port number to be used.

Since the VoIP configuration parameters provide a voice messaging identifier, once SIP registration is successful, the gateway GW sends a message to the entry point of the platform P_VoIP requesting a subscription to the voice messaging service. In this implementation, this message is an SIP SUBSCRIBE message. The VoIP telephone service platform P_VoIP relays this message to the voice messaging platform P_msg.

In turn, the voice messaging platform P_msg verifies that the customer using the terminal TRM exists in the public identifier database IMPU and that the user has subscribed to the voice messaging service, and then sends a SIP NOTIFY message to the gateway GW in order to notify the status of messages corresponding to that customer.

The countdown TIM is initialized (E012) as from activation (E218) of the VoIP telephone service. Also, as from activation (E218) of the service, the gateway GW maintains the VoIP telephone service in accordance with the prior art. This maintenance of VoIP telephone service includes periodically renewing a DHCP lease of the IP address dedicated to the VoIP service, periodically renewing the SIP registration, and periodically renewing the subscription to the MWIO voice messaging service.

Expiry of the countdown TIM is detected during a step E015. Assuming that the terminal TRM has remained connected to the gateway GW up to expiry of the countdown TIM, the gateway GW continues to maintain the VoIP telephone service during a step E020 in accordance with the prior art: renewal of the DHCP lease, of the SIP registration, and of the subscription to the MWI voice messaging service.

The gateway GW initializes (E012) a new cycle of the countdown TIM.

Expiry of this new cycle of the countdown TIM is detected during a step E116. It is assumed that the terminal TRM has been disconnected from the gateway GW before the countdown TIM expires and that it has not been reconnected. On expiry of the countdown TIM (E116), detecting that there is no connection of a terminal TRM shows that the VoIP telephone service has not been used during this 2-month duration. As a result, during a step E118, the gateway GW deactivates the VoIP telephone service.

Deactivating (step E118) the VoIP telephone service is known in the prior art, and it is described in general manner below. In this implementation, deactivation comprises:
the SIP stack of the gateway GW sending a message to the platform P_VoIP for unsubscribing from the MWI messaging service, and the gateway GW receiving from the messaging platform P_msg a message concerning the state of voice messages of the customer having the corresponding public telephone identity IMPU. On acknowledging this reception, resources (memory and calculation capacity) are released in the voice messaging platform P_msg;
the SIP stack of the gateway GW sending a message to the platform P_VoIP unsubscribing from the VoIP telephone service. Resources of the service platform P_VoIP are released; and
if the architecture is Multi-VLAN or Multi-VC, the gateway GW sending a message to the DHCP server releasing the IP address that was allocated to the gateway GW specifically for the VoIP telephone service.

A new observation cycle is launched (E012) after deactivating (E118) the VoIP telephone service.

When the VoIP telephone service is not active and the gateway GW detects expiry of the countdown TIM in a step E316 without detecting a connected state of a terminal, the gateway GW reinitializes the countdown in a step E012 for a new observation cycle.

Variant of the First Implementation

In an implementation, the gateway GW includes an integrated digital telephone base using CAT-iq technology. A terminal TRM of DECT Cat-iq type can be paired with this DECT Cat-iq base integrated in the gateway GW. The flow chart of FIG. 2 can be applied in this implementation.

Detailed Description of a Second Implementation

Figure 4:
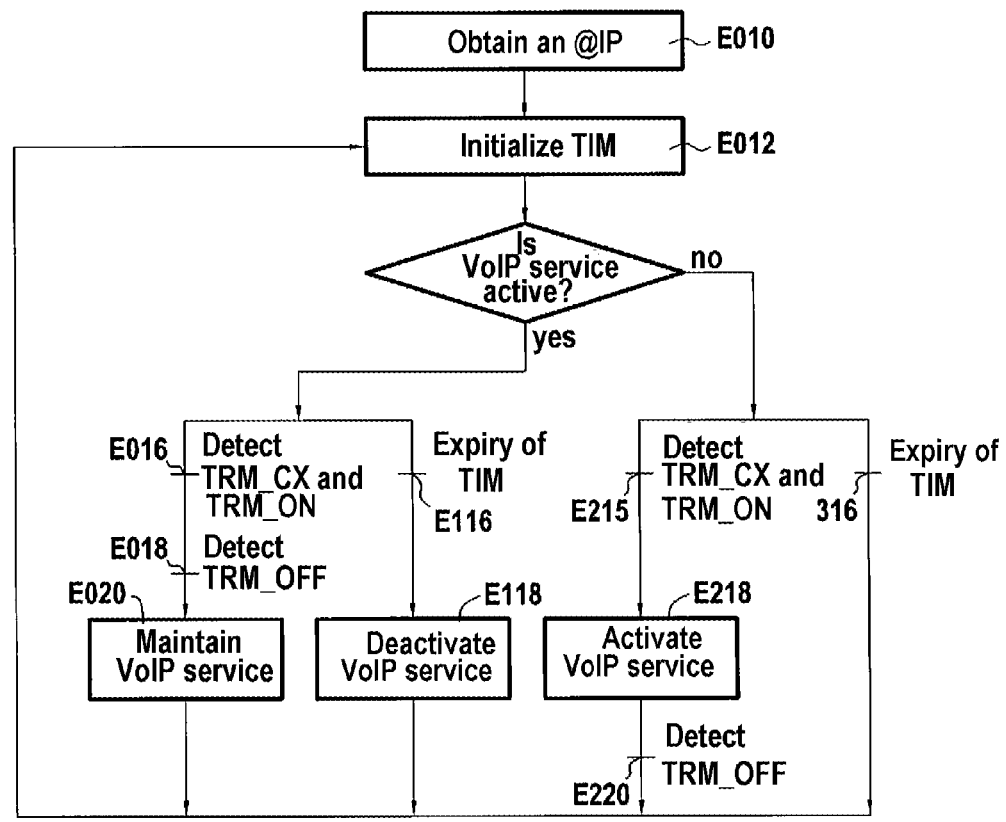
FIG. 4 is a flow chart showing the steps of a voice over IP service management method in accordance with a second implementation of the invention.

FIG. 4 is a flow chart showing the steps of a method of managing VoIP service in accordance with a second implementation.

This second implementation provides better optimization of resources than the first implementation described above with reference to FIGS. 2 and 3. In this second implementation, the VoIP telephone service is not activated on detecting a connected state of the terminal TRM, but rather on detecting both a connected state and an off-hook state representative of the fact that the VoIP telephone service is indeed being used.

In this implementation, the terminal TRM is a wireless DECT or DECT Cat-Ig digital telephone suitable for connecting to a wireless telephone base integrated in the gateway GW, as shown in FIG. 3.

As described above, on starting the gateway GW, the gateway obtains at least one IP address during the step E010. The gateway GW initializes the countdown TIM during the step E012. In this implementation, the VoIP telephone service is initially not activated.

In a step E216, the gateway detects that the terminal TRM is both in a connected (TRM_CX) state and in an off-hook (TRM_ON) state by means of the electronic component pGW_DECT of the wireless telephone base integrated in the gateway GW.

Following this detection, the gateway GW activates the VoIP telephone service during a step E218.

By means of the component pGW_DECT, the gateway GW detects (E220) that the terminal TRM has hung up. Thereafter, the gateway GW reinitializes the countdown TIM in a step E012.

If the gateway GW detects a new connected and off-hook state of the terminal TRM (step E016), the gateway GW waits to detect a hung-up state (step E018) in order to continue maintaining the VoIP telephone service during a step E020.

If expiry of the countdown TIM is detected (step E116) when the gateway GW has not detected a connected and off-hook state of the terminal TRM, the gateway GW deactivates the VoIP telephone service during a step E118.

The steps E218 of activating service, E118 of deactivating the service, and E020 of maintaining the service are identical to the steps E218, E118, and E020 described above with reference to FIG. 2.

Variants of the Second Implementation

Figure 5:
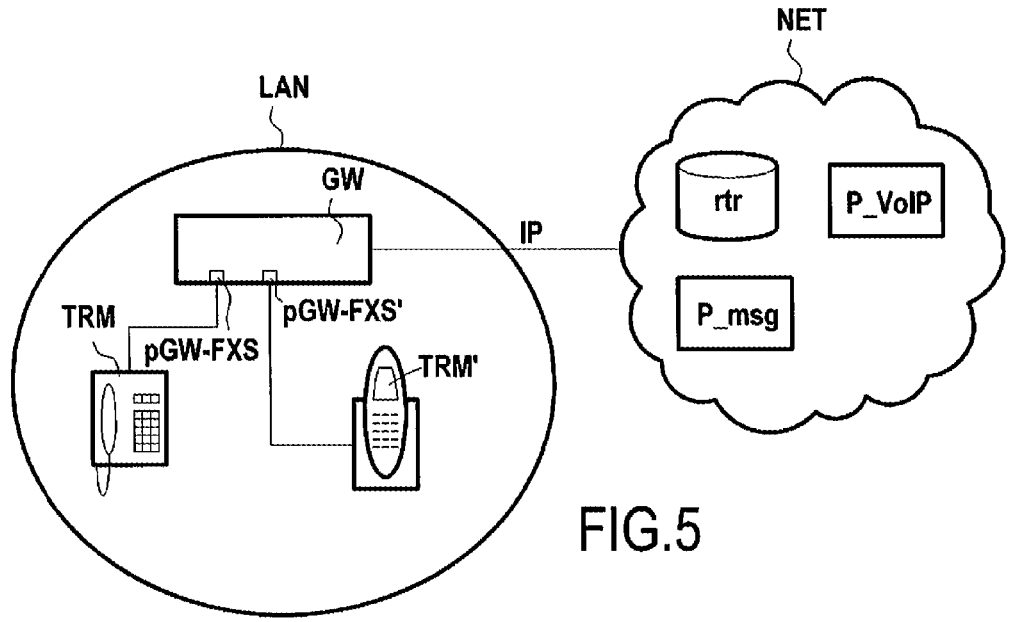
FIG. 5 shows a network architecture enabling a voice over IP service management method to be performed in accordance with the second implementation of the invention.

In an implementation, the gateway GW has an analog port pGW_FXS of the FXS type to which an analog telephone TRM can be connected. FIG. 5 shows an architecture for a network enabling the voice over IP service management method to be performed in this implementation. The flow chart of FIG. 4 is equally applicable in this implementation. Indeed, the connection of an analog terminal to the port pGW_FXS of the gateway GW is detected by the terminal TRM being picked up.

The flow chart of FIG. 4 can also be applied in an implementation in which the terminal TRM is a digital telephone suitable for connecting to the analog port pGW_FXS of the gateway GW.

The flow chart of FIG. 4 can also be applied in an implementation in which a wireless digital telephone TRM', e.g. of DECT type, has a base suitable for connecting to analog port pGW_FXS' of the gateway GW.

Other Implementations

In an implementation, the gateway GW reinitializes (E012) the countdown TIM only after activating (E218) or maintaining (E020) the VoIP telephone service on the gateway GW. In this implementation, the countdown TIM is not reinitialized after deactivating (E118) the VoIP telephone service. If the gateway GW detects (E215) a new connected state of the terminal after the step (E118) of deactivating the VoIP telephone service, then the gateway reactivates (E218) the service.

In an implementation, the gateway GW communicates with the VoIP telephone service platform P_VoIP using one of the following protocols: IMS, H323, MGCP, WebRTC.

In an implementation, the VoIP telephone service is initially activated on the gateway GW for its first installation. In practice, it is highly probable that a user connects a terminal TRM to the gateway GW on first installation of the gateway, so as to try out all of the services. This implementation makes it possible to avoid the waiting time required for activating the VoIP telephone service, even though this time is only of the order of 1 to 2 seconds. In this implementation, the gateway GW initializes (E012) the countdown TIM on first installation.

In an implementation, the gateway GW delivers a specific tone during the step (E218) of activation of the VoIP telephone service, e.g. a busy tone or a voice announcement stating the VoIP telephone service is being activated.

In an implementation, when the VoIP telephone service is not activated on the gateway GW, and the gateway detects (E216) a connected and off-hook state, the gateway GW does not automatically deliver a busy tone or a voice announcement indicating that the VoIP telephone service is not activated in order to avoid degrading the user experience and to avoid the user hanging up. Specifically, activation is a process that lasts for about 1 to 2 seconds.

In an implementation, when activating the VoIP telephone service is not successful after a certain length of time, e.g. after 2 seconds as a result of a technical failure, the gateway GW delivers a busy tone or a voice message indicating that the VoIP telephone service is temporarily not available.

In an implementation, the gateway GW has means for storing a dialed telephone number. Assuming that the VoIP telephone service is deactivated on the gateway GW and that a user picks up a terminal TRM connected to the gateway in order to make a call, the gateway GW detects (E216) the connected and off-hook state of the terminal, and stores the dialed number during the step (E218) of activating the VoIP telephone service so that the user does not need to dial the called number again. After the VoIP telephone service has been activated, the gateway GW sends an outgoing call generation message, e.g. by sending a SIP INVITE message, which message contains the stored number.

In an implementation, the gateway GW stores the most recent time and date of activating the VoIP telephone service. If the gateway GW is switched off and then switched back on again, the gateway compares the switch-on date and time with the date and time that has been saved and readjusts the value of the countdown TIM as a function of the results of this comparison.

In an implementation, a web portal or a voice portal internal to the gateway GW restores the activated or deactivated state of the VoIP telephone service and/or the value of the countdown TIM In an implementation, the gateway GW returns the (activated or deactivated) state of the VoIP telephone service to the network NET of the service provider, e.g. to an Internet service platform or to the platform in charge of VoIP configuration.

Figure 6:
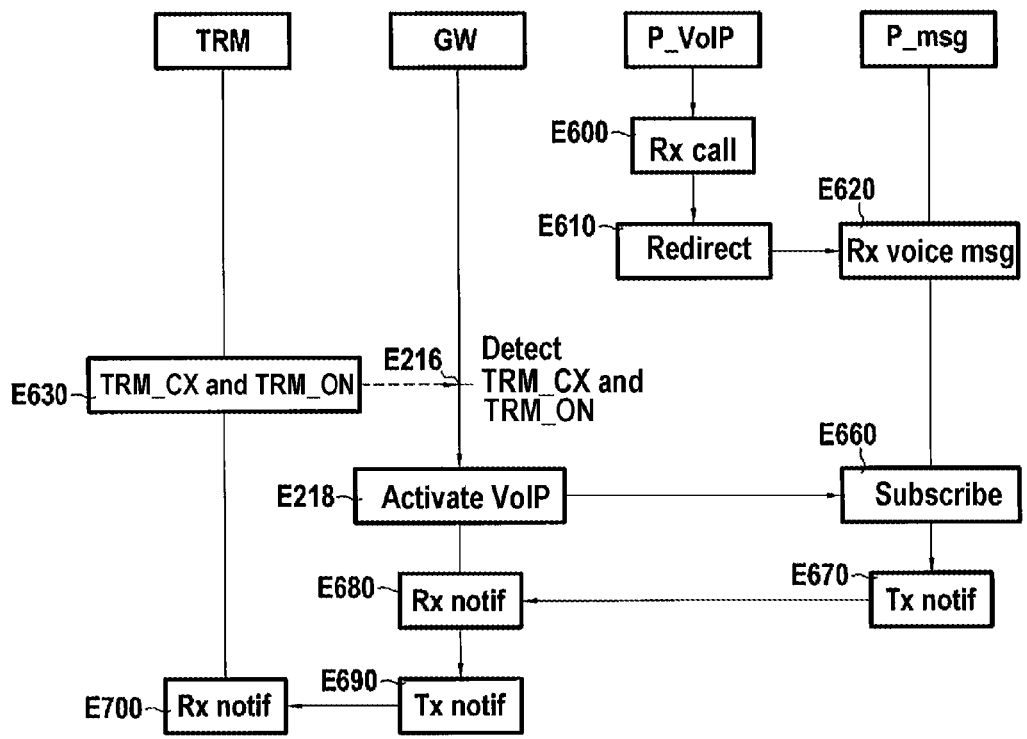
FIG. 6 is a flow chart showing steps of the VoIP telephone service management method in an implementation of the invention.

FIG. 6 is a flow chart showing the steps of the method of managing the VoIP telephone service in accordance with an implementation of the invention.

The method of the invention is performed by a gateway GW between a local network LAN and a network NET of a VoIP telephone service provider by performing steps E216, E218, and E680.

The network NET has a VoIP telephone service platform P_VoIP and a voice messaging service P_msg.

It is assumed that the VoIP telephone service is initially not activated on the gateway GW.

During a step E600, the VoIP telephone service platform P_VoIP receives a call for a user of a terminal TRM suitable for connecting to the gateway GW. Since the VoIP service is not activated on the gateway GW, the platform P_VoIP redirects the call during a step E610, to the messaging platform P_msg.

During a step E620, the platform P_msg receives and stores a voice message following the failed call.

During a step E630, the terminal TRM is connected to the gateway GW and is picked up. The gateway detects the connected and off-hook state of the terminal TRM during a step E216 and it then activates the VoIP telephone service during a step E218.

As described above with reference to FIGS. 2 and 4, activation includes subscribing to the platform P_msg.

The platform P_msg sets up a subscription for the gateway GW for the account of the user of the terminal TRM during a step E660, and in particular a subscription to the MWI notification service.

During a step E670, the platform P_msg sends a notification to the gateway GW stating that a stored voice message is present (E620).

The gateway receives the notification during a step E680 and forwards it to the terminal TRM during a step E690.

The implementations described below serve to limit the impact of incoming calls that cannot be handled in real time.

In one implementation, when the VoIP telephone service is not activated on the gateway GW of a user, the voice messaging service is linked with an electronic messaging service in order to notify the user that a voice message has been received. For this purpose, an email generated by the voice messaging platform P_msg, e.g. containing the voice message as an attachment, is sent to the user.

In an implementation, when the VoIP telephone service is not activated on the gateway GW of a user, the voice messaging platform P_msg converges with a mobile telephone service. When a voice message is received and while the VoIP telephone service is not activated on the gateway GW, the voice messaging platform P_msg initializes the generation of a message, e.g. a short message service (SMS message) sent to a mobile telephone of the user.

In another implementation, when the VoIP telephone service is not activated on the gateway GW of a user, the voice messaging platform P_msg initializes generation of a notification in a visual voice mail service that is sent to an application installed on a mobile terminal of the user. The application makes it possible to download the voice message.

Description of a Gateway in Accordance with the Invention

Figure 7:
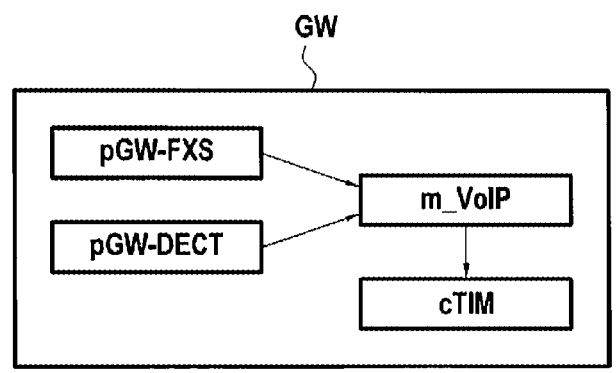
FIG. 7 shows the functional architecture of a gateway in an embodiment of the invention.

FIG. 7 shows the functional architecture of a gateway GW in accordance with an embodiment of the invention.

The gateway GW, which may be arranged between a local area network LAN and a wide area network WAN including a platform P_VoIP of a VoIP telephone service, comprises:
- a detector module pGW-DECT configured to detect a connected state of a terminal TRM connecting to the gateway GW; and
- a module m_VoIP for managing the VoIP telephone service, this module m_VoIP being configured to activate the VoIP telephone service on detecting the connected state.

In an embodiment, the gateway GW has at least one detector module pGW-DECT or pGW_FXS configured to detect the connected and off-hook state of a terminal TRM connected to the gateway GW. In this embodiment, the VoIP telephone service management module m_VoIP is configured to activate the VoIP telephone service on detecting the connected and off-hook state of the terminal TRM.

In an embodiment, the gateway GW includes a time countdown cTIM controlled by the VoIP telephone service management module m_VoIP to determine how this management module m_VoIP is to operate.

In an embodiment, the gateway GW includes a wireless telephone base of the kind shown in FIG. 3. The base includes an electronic component pGW-DECT configured to detect at least one state of the terminal TRM from among the connected state and the off-hook state.

In an embodiment, the gateway GW includes at least one electronic component pGW-FXS of the FXS type, as shown in FIG. 5. This component pGW-FXS is configured to detect the connected and off-hook state of the terminal TRM.

In an embodiment, the gateway GW also includes a display for indicating the activated or non-activated state of the VoIP telephone service.

Figure 8:
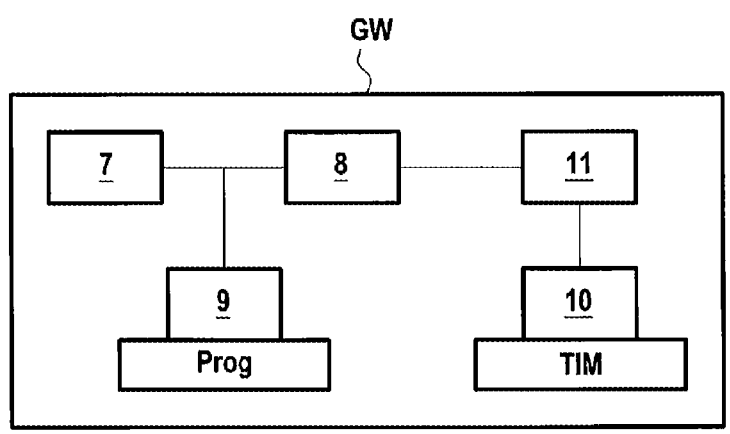
FIG. 8 shows the hardware architecture of a gateway in an embodiment of the invention.

In the presently-described embodiment, the gateway GW in accordance with the invention has the architecture of a computer, as shown in FIG. 8. In particular, it comprises a processor 7, a random access memory (RAM) 8, a ROM 9, a non-volatile flash memory 10 in a particular embodiment of the invention, together with communication means 11. Such means are themselves known and are not described in detail herein.

The ROM 9 of the gateway GW of the invention constitutes a data medium in accordance with the invention that is readable by the processor 7 and that, in this example, stores a computer program Prog in accordance with the invention.

The memory 10 of the gateway GW serves to store variables used for executing steps of the invention, such as the value of the countdown TIM, the IP address(es) of the gateway GW, the technical address AoC of the gateway GW, the VoIP configuration parameters, etc.

The computer program Prog defines functional and software modules that are configured in this example for managing a VoIP telephone service. These functional modules rely on and/or control the above-mentioned hardware elements 7-11 of the gateway GW.

The invention claimed is:

1. A method of managing a VoIP telephone service performed by a gateway between a LAN and a WAN or a MAN that includes a platform of the VoIP telephone service, the method including, when the VoIP telephone service is inactived, activating the VoIP telephone service on detecting a connected state of a terminal connected to the gateway, the method further comprising deactivating the VoIP telephone service after an activation duration.

2. The method of claim 1, wherein the connected state of the terminal is detected when an off-hook state of the terminal is detected.

3. The method of claim 1, wherein activating the VoIP telephone service depends on detecting both the connected state and the off-hook state of the terminal.

4. The method of claim 1, wherein said activation duration corresponds to an expiration of a countdown timer initialized on the activation.

5. The method of claim 4, further including reinitializing the countdown on detecting a hung-up state following detecting the connected and off-hook states of the terminal.

6. A non-transitory computer readable medium having stored thereon instructions which, when executed by a processor, cause the processor to implement the method of claim 1.

7. The method of claim 1, wherein activating the VoIP service comprises:
   receiving VoIP configuration parameters in response to a request sent by the gateway; and
   registering the gateway to the platform of the VoIP telephone service based on at least one of the received VoIP configuration parameters.

8. A method of managing a VoIP telephone service performed by a gateway between a LAN and a WAN or a MAN that includes a platform of the VoIP telephone service, the method including, when the VoIP telephone service is inactived, activating the VoIP telephone service on detecting a connected state of a terminal connected to the gateway and deactivating the VoIP telephone service after an activation duration, wherein the activation duration corresponds to an expiration of a countdown timer initialized on the activation.

9. A gateway between a LAN and a WAN or a MAN including a VoIP telephone service platform, the gateway comprising:
   at least one detector configured to detect a connected state of a terminal connected to the gateway; and
   a manager of the VoIP telephone service, configured to, when the VoIP telephone service is inactived, activate the VoIP telephone service on detecting the connected state, the manager configured to deactivate the VoIP telephone service after an activation duration.

10. The gateway of claim 9, wherein the detector is configured to detect an off-hook state of the terminal connected to the gateway.

11. The gateway of claim 10, wherein the manager of the VoIP telephone service is configured to activate the VoIP telephone service on detecting both the connected state and the off-hook state of the terminal.

12. The gateway of claim 9, additionally including a wireless telephone base, the base including an electronic component configured to detect at least one state of the terminal from among the connected state and the connected and off-hook state.

13. The gateway of claim 9, additionally including at least one electronic component of FXS type configured to detect both the connected state and the off-hook state of the terminal.

14. The gateway of claim 9, additionally including a countdown controlled by the manager of the VoIP telephone service, in order to determine how the manager is to be operated.

15. The gateway of claim 9, wherein the manager of the VoIP telephone service is configured to activate the VoIP service by:
- receiving VoIP configuration parameters in response to a request sent by the gateway; and
- registering the gateway to the platform of the VoIP telephone service based on at least one of the received VoIP configuration parameters.

16. A non-transitory computer readable medium having stored thereon instructions which, when executed by a processor, cause the processor to implement the method of claim 8.

17. The method of claim 16, wherein the connected state of the terminal is detected when an off-hook state of the terminal is detected.

18. The method of claim 16, wherein activating the VoIP telephone service depends on detecting both the connected state and the off-hook state of the terminal.

19. The method of claim 16, further including reinitializing the countdown on detecting a hung-up state following detecting the connected and off-hook states of the terminal.

20. A gateway configured to implement the method of claim 16.

* * * * *